(12) United States Patent
Thomas et al.

(10) Patent No.: US 10,771,379 B2
(45) Date of Patent: Sep. 8, 2020

(54) APPARATUS, SYSTEM, AND METHOD FOR DISCOVERING NETWORK PATHS

(71) Applicant: Juniper Networks, Inc., Sunnyvale, CA (US)

(72) Inventors: Reji Thomas, Trivandrum (IN); Ronald Bonica, Sterling, VA (US); Ramakrishna Manjunath, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/209,954

(22) Filed: Dec. 4, 2018

(65) Prior Publication Data
US 2020/0177498 A1    Jun. 4, 2020

(51) Int. Cl.
*H04L 12/721* (2013.01)
*H04L 12/741* (2013.01)
*H04L 12/733* (2013.01)
*H04L 12/751* (2013.01)

(52) U.S. Cl.
CPC .............. *H04L 45/26* (2013.01); *H04L 45/02* (2013.01); *H04L 45/122* (2013.01); *H04L 45/745* (2013.01)

(58) Field of Classification Search
CPC ......... H04L 45/02; H04L 45/04; H04L 45/10; H04L 2012/5608; H04L 2012/64; H04L 12/64; H04L 65/102; H04L 29/06176; H04L 12/6418; H04W 84/12;

(Continued)

(56) References Cited

U.S. PATENT DOCUMENTS

| | | | | |
|---|---|---|---|---|
| 5,987,011 A | * | 11/1999 | Toh | H04W 40/10 370/331 |
| 9,036,509 B1 | * | 5/2015 | Addepalli | H04W 72/0406 370/259 |
| 10,257,080 B1 | * | 4/2019 | Kusam | H04L 45/60 |

(Continued)

OTHER PUBLICATIONS

Wikipedia, "Equal-cost multi-path routing", URL: https://en.wikipedia.org/wiki/Equal-cost_multi-path_routing, Jun. 2018, 3 pages.

(Continued)

*Primary Examiner* — Brenda H Pham
(74) *Attorney, Agent, or Firm* — FisherBroyles, LLP

(57) ABSTRACT

The disclosed computer-implemented method may include (1) receiving, at a source node, a request to discover a plurality of network paths that each lead from the source node to a destination node and (2) discovering the plurality of network paths by (A) identifying each next hop between the source node and the destination node, (B) sending, from the source node to each next hop, a path-request probe that prompts the next hop to (i) determine each next-closest hop and (ii) return, to the source node, a path-response probe that identifies the next-closest hops, (C) receiving the path-response probes from the next hops, (D) determining, at the source node based on the path-response probes, that one or more of the plurality of network paths include the next hops and the next-closest hops, and then (E) iteratively discovering any subsequent hops by sending a subsequent path-request probe to each next-closest hop.

16 Claims, 10 Drawing Sheets

(58) Field of Classification Search
CPC ..... H04W 88/08; H04W 80/04; H04W 88/06; H04W 84/18; H04W 74/08
USPC ..... 370/400, 310.2, 328, 338, 352–356, 236
See application file for complete search history.

(56) References Cited

U.S. PATENT DOCUMENTS

| | | | |
|---|---|---|---|
| 2005/0018647 A1* | 1/2005 | Lebrun | H04L 29/12009 370/351 |
| 2013/0033978 A1* | 2/2013 | Eckert | H04L 45/16 370/216 |
| 2013/0290560 A1* | 10/2013 | Chaki | H04W 40/02 709/238 |
| 2016/0080505 A1* | 3/2016 | Sahin | H04L 67/1027 709/229 |
| 2019/0288948 A1* | 9/2019 | Hira | H04L 43/0864 |

OTHER PUBLICATIONS

Bialy, Marcin, "How does routing table work?", URL: https://www.grandmetric.com/2018/01/20/how-does-routing-table-work/, Jan. 20, 2018, 7 pages.
Wikipedia, "Type-length-value", https://en.wikipedia.org/wiki/Type-length-value, Oct. 2018, 3 pages.
Wikipedia, "Traceroute", URL: https://en.wikipedia.org/wiki/Traceroute, Nov. 2018, 4 pages.
U.S. Appl. No. 15/657,113, "Apparatus, System, and Method for Discovering Network Path Maximum Transmission Units" filed Jul. 22, 2017, 59 pages.

\* cited by examiner

APPARATUS, SYSTEM, AND METHOD FOR DISCOVERING NETWORK PATHS

BACKGROUND

Packets are often forwarded to specific network destinations via a series of intermediate network devices. For example, a packet addressed to a particular node may reach the node by way of a network path that includes multiple hops (e.g., nodes) between a source of the packet and its destination. Network administrators may wish to identify one or more of these intermediate hops. For example, an administrator may perform a traceroute operation that returns a network address of each node within a particular network path. The administrator may then perform a variety of tasks (e.g., detecting and/or troubleshooting malfunctions within the network path) based on this information.

Unfortunately, traditional systems for discovering network paths may be unable to provide comprehensive and/or complete traceroutes. For example, to increase the efficiency and/or bandwidth of a particular network connection, multiple network paths may be configured to forward packets between two nodes. A conventional traceroute technology may return only a single possible path. As such, network administrators may be unable to analyze and/or assess many of the network devices that forward packets between two nodes, thereby hindering the detection of errors within network paths between the nodes.

The instant disclosure, therefore, identifies and addresses a need for improved apparatuses, systems, and methods for discovering network paths.

SUMMARY

As will be described in greater detail below, the instant disclosure generally relates to apparatuses, systems, and methods for discovering network paths. In one example, a computer-implemented method for accomplishing such as task may include (1) receiving, at a source node, a request to discover a plurality of network paths that each lead from the source node to a destination node and (2) simultaneously discovering the plurality of network paths that lead from the source node to the destination node by (A) identifying each next hop that resides between the source node and the destination node, (B) sending, from the source node to each next hop, a path-request probe that prompts the next hop to (i) determine each next-closest hop that resides between the next hop and the destination node and (ii) return, to the source node, a path-response probe that identifies the next-closest hops as residing between the next hop and the destination node, (C) receiving, at the source node, the path-response probes from the next hops, (D) determining, at the source node based at least in part on the path-response probes, that one or more of the plurality of network paths include (i) the next hops that reside between the source node and the destination node and (ii) the next-closest hops that reside between the next hops and the destination node, and then (E) iteratively discovering any subsequent hops that reside between the next-closest hops and the destination node by sending a subsequent path-request probe to each next-closest hop.

As another example, a system for implementing the above-described method may include various modules stored in memory. The system may also include at least one hardware processor that executes these modules. For example, the system may include (1) a receiving module that receives, at a source node, a request to discover a plurality of network paths that each lead from the source node to a destination node and (2) a discovery module that simultaneously discovers the plurality of network paths that lead from the source node to the destination node by (A) identifying each next hop that resides between the source node and the destination node, (B) sending, from the source node to each next hop, a path-request probe that prompts the next hop to (i) determine each next-closest hop that resides between the next hop and the destination node and (ii) return, to the source node, a path-response probe that identifies the next-closest hops as residing between the next hop and the destination node, (C) receiving, at the source node, the path-response probes from the next hops, (D) determining, at the source node based at least in part on the path-response probes, that one or more of the plurality of network paths include (i) the next hops that reside between the source node and the destination node and (ii) the next-closest hops that reside between the next hops and the destination node, and then (E) iteratively discovering any subsequent hops that reside between the next-closest hops and the destination node by sending a subsequent path-request probe to each next-closest hop.

As a further example, an apparatus for implementing the above-described method may include at least one storage device that stores information that identifies next hops of a source node within a network. In this example, the apparatus may also include at least one physical processing device communicatively coupled to the storage device at the source node, wherein the physical processing device (1) receives, at the source node, a request to discover a plurality of network paths that each lead from the source node to a destination node and (2) simultaneously discovers the plurality of network paths that lead from the source node to the destination node by (A) identifying each next hop that resides between the source node and the destination node, (B) sending, from the source node to each next hop, a path-request probe that prompts the next hop to (i) determine each next-closest hop that resides between the next hop and the destination node and (ii) return, to the source node, a path-response probe that identifies the next-closest hops as residing between the next hop and the destination node, (C) receiving, at the source node, the path-response probes from the next hops, (D) determining, at the source node based at least in part on the path-response probes, that one or more of the plurality of network paths include (i) the next hops that reside between the source node and the destination node and (ii) the next-closest hops that reside between the next hops and the destination node, and then (E) iteratively discovering any subsequent hops that reside between the next-closest hops and the destination node by sending a subsequent path-request probe to each next-closest hop.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
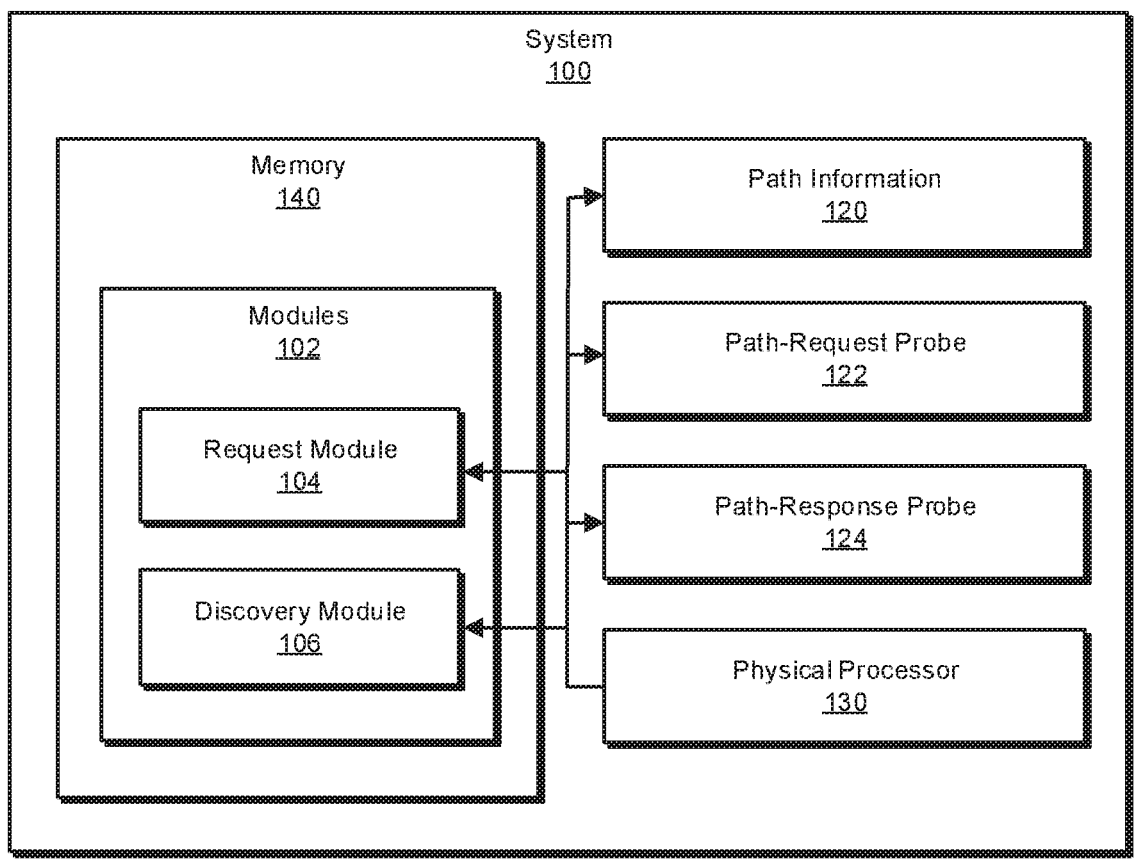
FIG. 1 is a block diagram of an exemplary system for discovering network paths.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for discovering network paths. As will be explained in greater detail below, embodiments of the instant disclosure may identify multiple network paths that each lead from a source node to a destination node. In some examples, the disclosed embodiments may identify each possible (e.g., each existing) network path between two nodes. In other examples, these embodiments may identify one or more paths that are suitable and/or configured for specific packets.

To accomplish the task of identifying multiple network paths between a source node and a destination node, embodiments of the instant disclosure may identify at least one hop that resides immediately downstream from the source node. The disclosed embodiments may then send, to this first hop, a probe that prompts the first hop to identify the next hop within each network path that leads from the first hop to the destination node. The first hop may then return the network addresses of these next hops to the source node. In response, the source node may send similar probes to each network address identified by the first hop. Embodiments of the instant disclosure may facilitate this iterative process of discovering next hops within the network paths until each subsequent hop has been identified. Accordingly, these embodiments may efficiently provide network administrators with multi-path traceroutes that describe all or a portion of the network paths that lead between two nodes.

By providing such multi-path traceroutes, the disclosed embodiments may enable network administrators to quickly and accurately troubleshoot malfunctions within network connections that utilize multiple network paths. Moreover, such multi-path traceroutes may facilitate discovering and recording comprehensive and/or complete network topologies. In contrast, traditional traceroute technologies may identify only a single potential network path between two nodes (even if multiple paths exist between the nodes).

Figure 2:
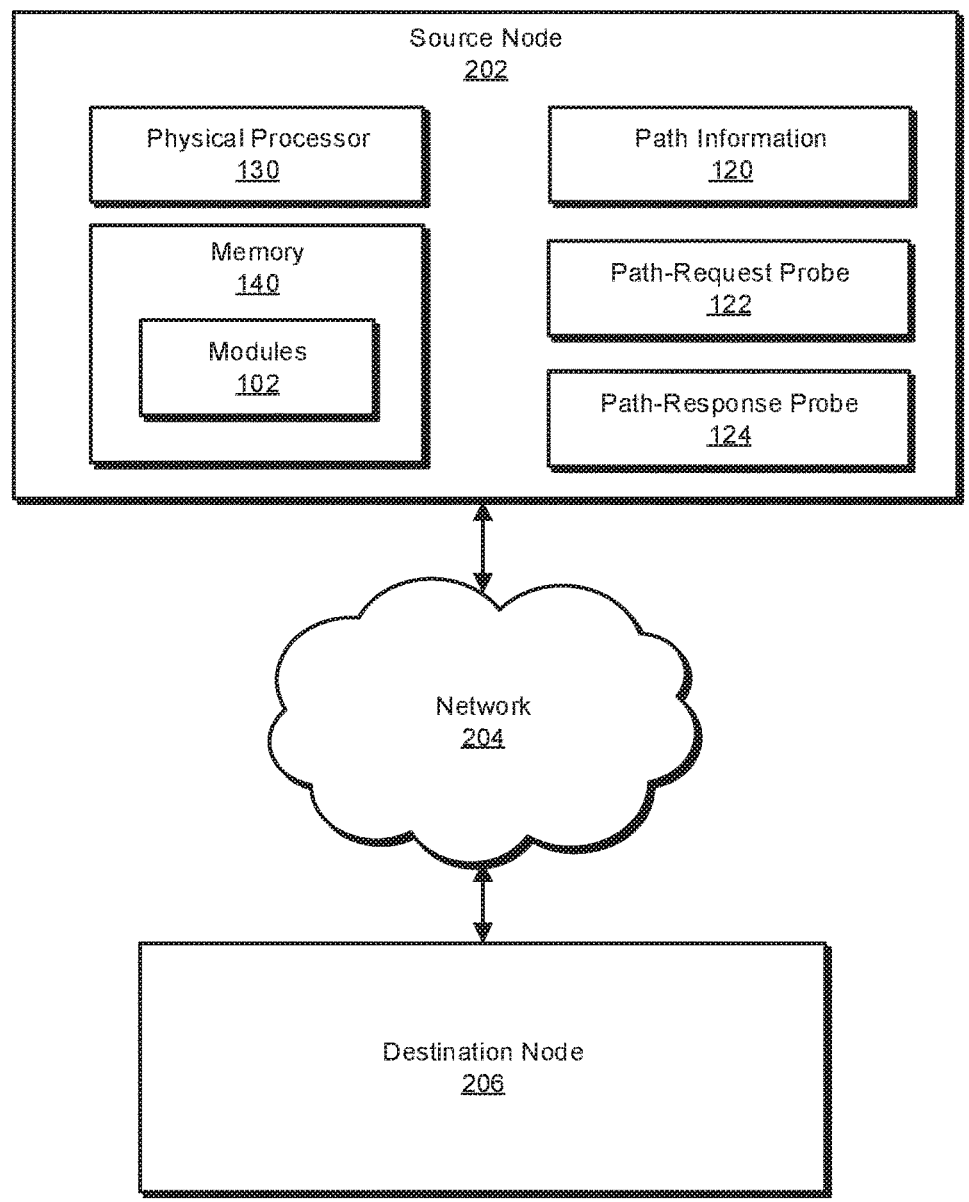
FIG. 2 is a block diagram of an additional exemplary system for discovering network paths.

The following will provide, with reference to FIGS. 1 and 2, detailed descriptions of exemplary systems for discovering network paths. Detailed descriptions of exemplary network paths between a source node and a destination node will be provided in connection with FIG. 4. Detailed descriptions of exemplary packets for discovering network paths will be provided in connection with FIGS. 5-9. Detailed descriptions of corresponding computer-implemented methods will be provided in connection with FIG. 3. In addition, detailed descriptions of an exemplary computing system for carrying out these methods will be provided in connection with FIG. 10.

FIG. 1 is a block diagram of an exemplary system 100 for discovering network paths. As illustrated in this figure, exemplary system 100 may include one or more modules 102 for performing one or more tasks. As will be explained in greater detail below, modules 102 may include a request module 104 and a discovery module 106. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., source node 202 and/or destination node 206). In addition, one or more of modules 102 may perform any of the functionality described herein in connection with any of the devices illustrated in FIG. 2. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate discovering network paths within a network. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include information that identifies one or more network paths, such as path information 120. In some examples, path information 120 may represent and/or identify a series of hops that leads between two network nodes. For example, path information 120 may identify each node (e.g., each router or other network device) that is capable of and/or configured to forward a packet between a particular source node and destination node.

In one embodiment, path information 120 may identify one or more distinct network paths that lead between a source node and a destination node. For example, path information 120 may collectively describe all or a portion of the equal-cost network paths that exist between the source node and the destination node. The term "equal-cost network paths," as used herein, generally refers to any group or set of network paths between two nodes that involve and/or require the same number of hops. In some examples, each equal-cost network path between a source node and a destination node may involve the minimum number of hops required to reach the destination node.

Additionally or alternatively, path information 120 may describe all or a portion of the network paths that a packet with one or more particular characteristics may potentially traverse between a source node and a destination node. For example, path information 120 may describe each network path that is configured to and/or capable of forwarding a packet of a specific protocol (e.g., a User Datagram Protocol (UDP) packet). In another example, path information 120 may describe each possible network path for a packet that is to be forwarded in accordance with a particular network policy (e.g., a security policy or a load-balancing policy).

As will be explained in greater detail below, the disclosed systems may discover all or a portion of the network paths described by path information 120. In some examples, the disclosed systems may identify path information 120 based at least in part on sending one or more path-request probes, such as a path-request probe 122 shown in FIG. 1. The term "path-request probe," as used herein, generally refers to any type or form of packet, message, or other unit of formatted data that a source node may send in order to identify additional nodes within network paths that lead between the source node and a destination node.

In some examples, path-request probe 122 may prompt a node that receives path-request probe 122 to identify all or a portion of the next hops within network paths that lead from the node to a particular destination node. The term "next hop," as used herein, generally refers to any node that resides immediately and/or directly downstream from another node within a network path. In some examples, a node within a network path may have more than one next hop (e.g., the node may be part of multiple network paths that each lead from a source node and a destination node).

In some examples, path-request probe 122 may also prompt a node to generate and return a path-response probe, such as a path-response probe 124 shown in FIG. 1. The term "path-response probe," as used herein, generally refers to any type or form of packet, message, or other unit of formatted data that identifies and/or lists each next hop discovered by a node that received a path-request probe. As will be explained in greater detail below, receiving a path-response probe at a source node may prompt the source node to send subsequent path-request probes to each node listed within the path-response probe. Accordingly, the disclosed systems may utilize path-request probes and path-response probes to iteratively discover multiple network paths that lead from a source node to a destination node.

Exemplary system 100 in FIG. 1 may be implemented in a variety of ways. For example, all or a portion of exemplary system 100 may represent portions of exemplary system 200 in FIG. 2. As shown in FIG. 2, system 200 may include a source node 202 in communication with a destination node 206 via a network 204. In one example, all or a portion of the functionality of modules 102 may be performed by source node 202, destination node 206, and/or any other suitable computing system. As will be described in greater detail below, one or more of modules 102 from FIG. 1 may, when executed by at least one processor of source node 202, enable source node 202 to discover all or a portion of the network paths that lead from source node 202 to destination node 206.

Source node 202 and destination node 206 each generally represent any type or form of physical computing device that facilitates communication within a network and/or across networks. In one embodiment, source node 202 may represent a node that is upstream relative to destination node 206. In some examples, source node 202 and destination node 206 may each include and/or represent a router (such as a customer edge router, a provider edge router, a hub router, a spoke router, an autonomous system boundary router, and/or an area border router). Additional examples of source node 202 and destination node 206 include, without limitation, switches, hubs, modems, bridges, repeaters, gateways, multiplexers, network adapters, network interfaces, servers, portions of one or more of the same, combinations or variations of one or more of the same, and/or any other suitable network nodes.

Network 204 generally represents any medium or architecture capable of facilitating communication or data transfer. In one example, network 204 may facilitate communication between source node 202 and destination node 206. In particular, network 204 may facilitate this communication via one or more intermediate nodes (e.g., hops) between source node 202 and destination node 206. These intermediate nodes may represent and/or include any type or form of suitable network device.

Network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, a resource RSVP-TE network, portions of one or more of the same, variations or combinations of one or more of the same, and/or any other suitable network. Although illustrated as being external to network 204 in FIG. 2, source node 202 and destination node 206 may each represent a portion of network 204 and/or be included in network 204.

Figure 3:
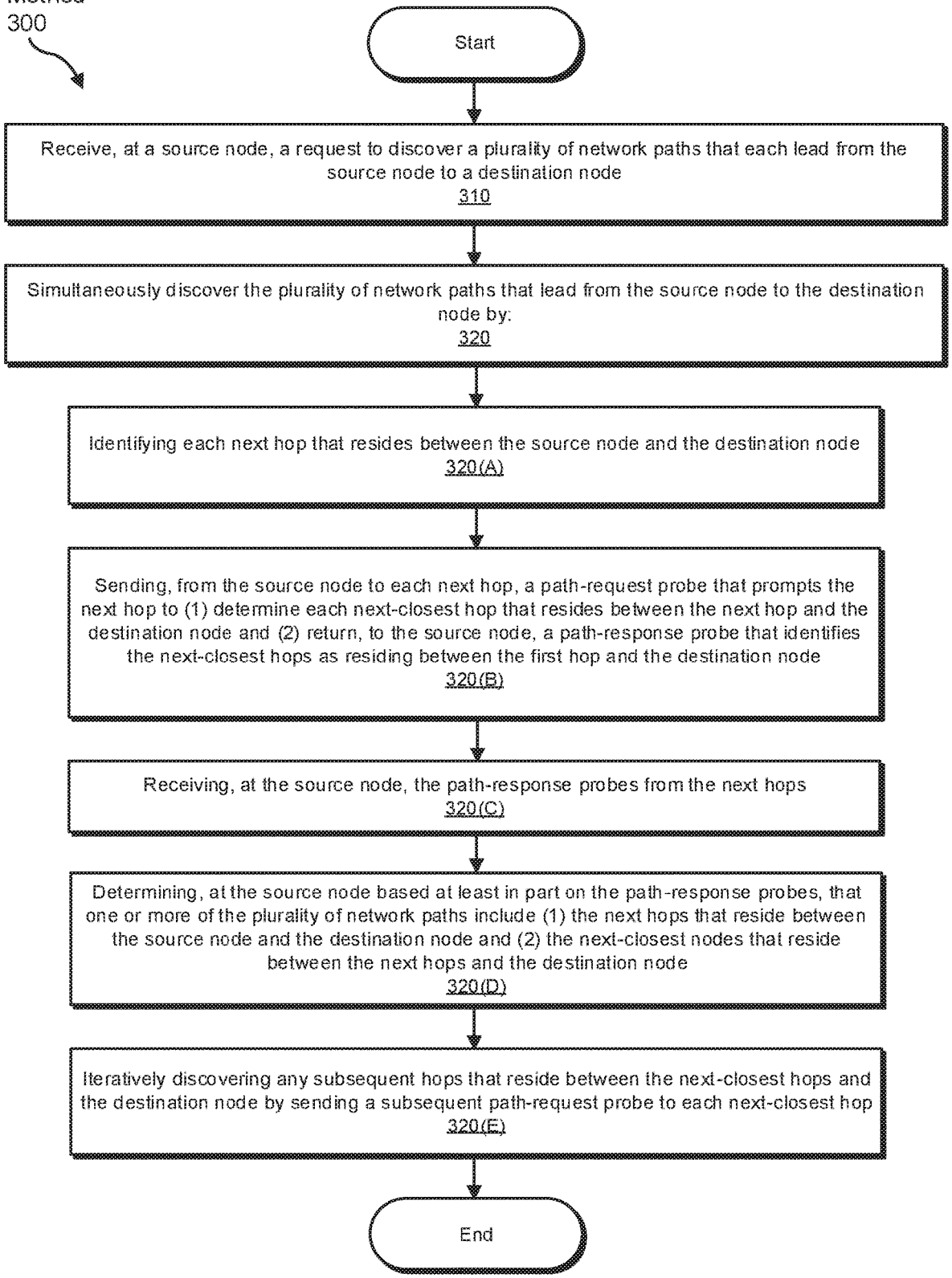
FIG. 3 is a flow diagram of an exemplary method for discovering network paths.

FIG. 3 is a flow diagram of an example computer-implemented method 300 for discovering network paths. The steps shown in FIG. 3 may be performed by any suitable computer-executable code and/or computing system, including system 100 in FIG. 1 and/or system 200 in FIG. 2. In one example, each of the steps shown in FIG. 3 may represent an algorithm whose structure includes and/or is represented by multiple sub-steps, examples of which will be provided in greater detail below.

As illustrated in FIG. 3, at step 310 one or more of the apparatuses and/or systems described herein may receive, at a source node, a request to discover a plurality of network paths that each lead from the source node to a destination node. For example, receiving module 104 may, as part of source node 202 in FIG. 2, receive a request to discover a plurality of network paths that each lead from source node 202 to destination node 206.

Figure 4:
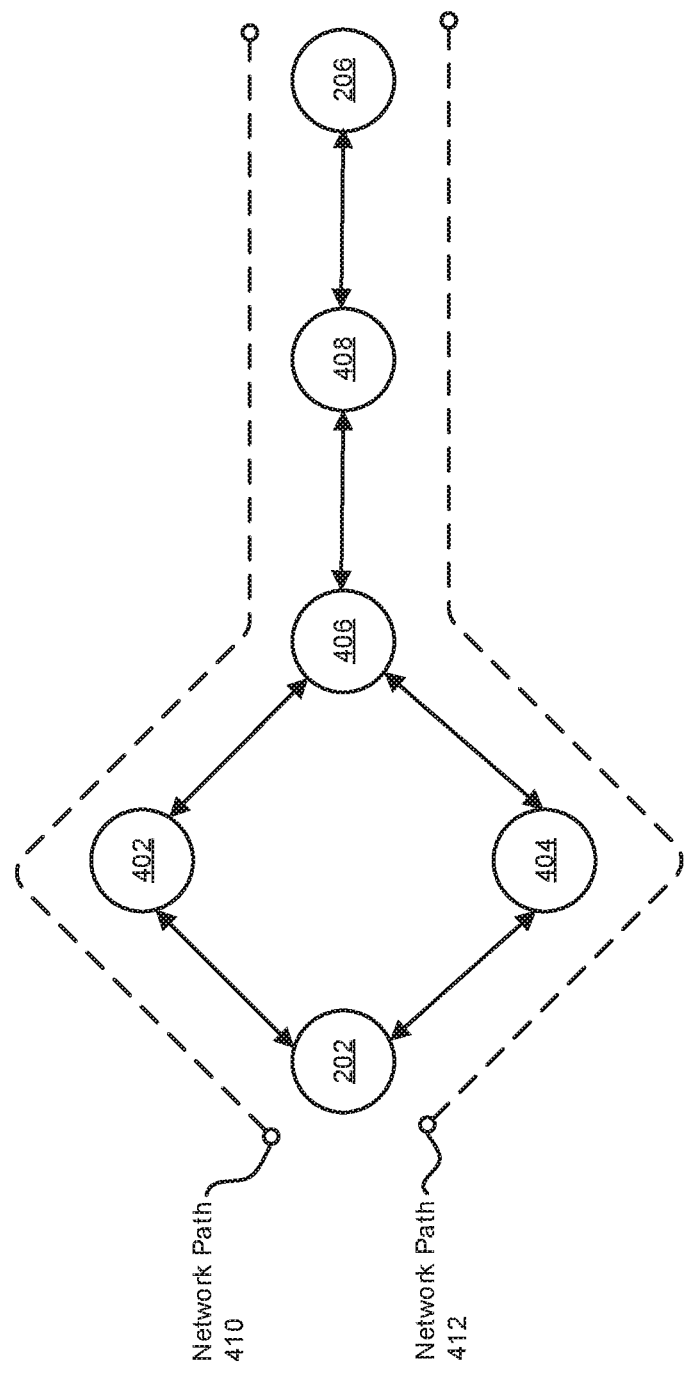
FIG. 4 is an illustration of exemplary network paths.

FIG. 4 illustrates exemplary network paths that each lead from source node 202 to destination node 206. Specifically, this example shows a network path 410 that consists of source node 202, a node 402, a node 406, a node 408, and destination node 206. FIG. 4 also illustrates a network path 412 that consists of source node 202, a node 404, node 406, node 408, and destination node 206. In one embodiment, network paths 410 and 412 may represent equal-cost network paths.

The systems described herein may perform step 310 in a variety of different ways and/or contexts. In some examples, receiving module 104 may receive a request to perform a multi-path traceroute for network paths between source node 202 and destination node 206. The term "traceroute," as used herein, generally refers to any type or form of tool, technique, and/or process that identifies a network address of each hop within a network path. Accordingly, the term "multi-path traceroute," as used herein, generally refers to any type of traceroute that identifies the network address of each hop within all or a portion of the existing network paths between two network nodes.

In some embodiments, receiving module 104 may receive a request to perform a general and/or comprehensive multi-path traceroute. For example, receiving module 104 may receive a request to perform a multi-path traceroute that returns each equal-cost network path between source node 202 and destination node 206. Additionally or alternatively, receiving module 104 may receive a request to perform a multi-path traceroute for a particular type of packet. For example, receiving module 104 may receive a request to identify each possible network path for packets that are to be forwarded via a particular protocol. As another example, receiving module 104 may receive a request to identify each possible network path for a packet that is to be forwarded in accordance with one or more network policies (such as a security policy and/or a load-balancing policy). In a further example, receiving module 104 may receive a request to identify the precise path that a particular packet is expected to traverse while traveling between source node 202 and destination node 206.

Receiving module 104 may receive a request to perform a multi-path traceroute from any type or form of user, administrator, application, network device, and/or other type of entity. In one example, receiving module 104 may receive a request from a traceroute application (e.g., an application that initiates performing traceroutes and/or provides the results of a traceroute to an administrator). In one embodiment, this traceroute application may reside and/or operate within source node 202. In other embodiments, receiving module 104 may receive a request from a traceroute application that operates external to and/or remotely from source node 202.

Returning to FIG. 3, at step 320 one or more of the apparatuses and/or systems described herein may simultaneously discover the plurality of network paths that lead from the source node to the destination node. For example, discovery module 106 may, as part of source node 202 in FIG. 2, simultaneously discover the plurality of network paths that lead from source node 202 to destination node 206. In one embodiment, step 320 may include one or more sub-steps, such as steps 320(A-E). At step 320(A), discovery module 106 may identify each next hop that resides between source node 202 and destination node 206.

The systems described herein may perform step 320(A) in a variety of different ways and/or contexts. In some examples, discovery module 106 may identify each next hop that resides between source node 202 and destination node 206 by searching a routing table utilized by source node 202. The term "routing table," as used herein, generally refers to any type or form of data structure that stores one or more network paths to facilitate forwarding packets to various network destinations. For example, a routing table within a node may list the network addresses (e.g., Internet protocol (IP) addresses) of hops within one or more network paths that include the node. In some examples, discovery module 106 may, while operating as part of and/or within source node 202, identify one or more next hops that reside between source node 202 and destination node 206 by querying and/or analyzing the routing table of source node 202.

Additionally or alternatively, discovery module 106 may identify one or more next hops that reside between source node 202 and destination node 206 by sending a path-request probe to source node 202. For example, discovery module 106 may, while operating as part of a traceroute application within source node 202, send a path-request probe to a network stack of source node 202. In another example, discovery module 106 may send a path-request probe to the network stack of source node 202 while operating within an external and/or remote node.

Figure 5:
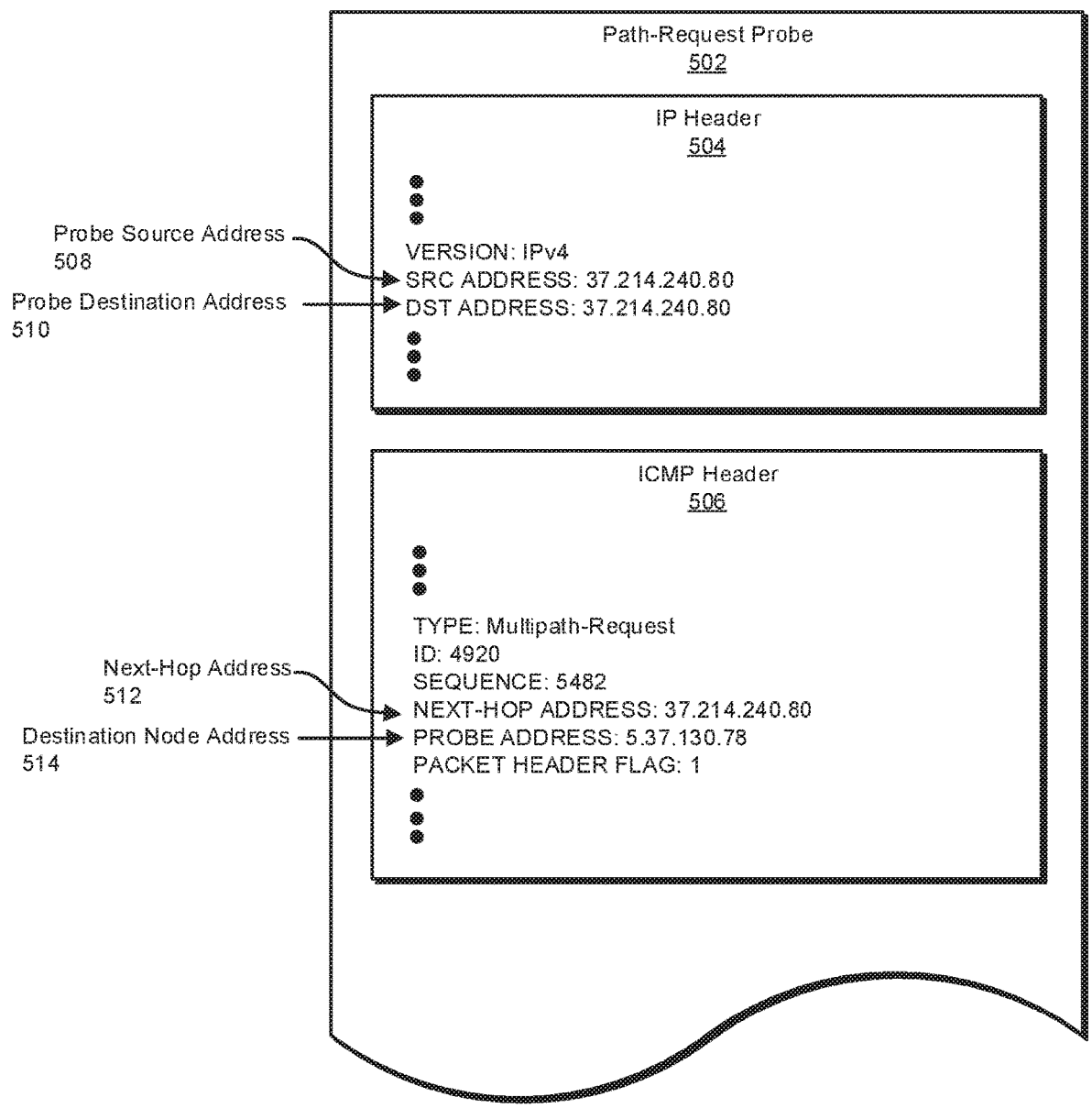
FIG. 5 is an illustration of an exemplary packet for discovering network paths.

FIG. 5 illustrates an exemplary path-request probe 502 that discovery module 106 may send to the network stack of source node 202. In this example, path-request probe 502 may include an IP header 504 and an Internet Control Message Protocol (ICMP) header 506. Path-request probe 502 may include any additional headers and/or data fields not illustrated in FIG. 5.

As shown in FIG. 5, IP header 504 may include a probe source address 508 that identifies the IP address of the node that generated path-request probe 502. IP header 504 may also include a probe destination address 510 that identifies the IP address of a node to which path-request probe 502 is at least intermediately destined. In the example of FIG. 5, both probe source address 508 and probe destination address 510 may correspond to the IP address of source node 202. IP header 504 may include any additional information (such as an IP version number and/or properties of path-request probe 502) that facilitates routing and/or forwarding path-request probe 502.

In the example of FIG. 5, ICMP header 506 may include one or more data fields that prompt and/or enable source node 202 to identify the next hop within at least one network path that leads from source node 202 to destination node 206. In some examples, at least one of these data fields may be encoded by a type-length-value (TLV) encoding scheme.

In one embodiment, ICMP header 506 may include a data field that indicates path-request probe 502 is a "multipath-request" packet. This indication may prompt source node 202 to generate and return a path-response probe to the network stack of source node 202.

ICMP header 506 may also include a next-hop address 512 that identifies the IP address of the final destination of path-request probe 502. In the example of FIG. 5, this IP address may match probe destination address 510. After receiving path-request probe 502, source node 202 may compare next-hop address 512 with its own (e.g., local) IP address. In response to determining that next-hop address 512 corresponds to its own IP address, source node 202 may determine that path-request probe 502 was destined for source node 202. In the event that source node 202 (or any additional node) receives a path-request probe with a next-hop address that does not match the node's own IP address, the node may forward the path-request probe to the next-hop address listed within the path-request probe.

ICMP header 506 may additionally include a destination node address 514 that identifies the IP address of destination node 206. Based at least in part on this IP address, source node 202 may identify the IP address of each next hop that resides between source node 202 and destination node 206 within the routing table of source node 202. For example, source node 202 may search the routing table to identify previously established network paths that lead to destination node 206.

In some examples, source node 202 may search this routing table based on additional information included within ICMP header 506, such as a packet header flag. In the event that this flag is set (as illustrated in FIG. 5), source node 202 may identify next hops within network paths that are suitable and/or designed for packets with properties indicated by the headers of path-request probe 502. For example, IP header 504 and/or ICMP header 506 may include one or more settings and/or characteristics indicative of packets that are to be forwarded via a specific protocol and/or in accordance with a specific network policy. Specifically, IP header 504 and/or ICMP header 506 may include and/or represent the headers of a specific packet that is to be forwarded (or has already been forwarded) to destination node 206.

In some examples, source node 202 may identify next hops within network paths that are appropriate and/or suitable for settings and/or characteristics indicated by path-request probe 502 (while disregarding next hops within inappropriate and/or unsuitable network paths). In one embodiment, source node 202 may identify these hops by providing information from the headers of path-request probe 502 to a hash function that is utilized by the routing table of source node 202 to select equal-cost network paths. By searching for next hops based on such information, the disclosed systems may facilitate performing multi-path traceroutes for specific packets and/or specific types of packets.

Figure 6:
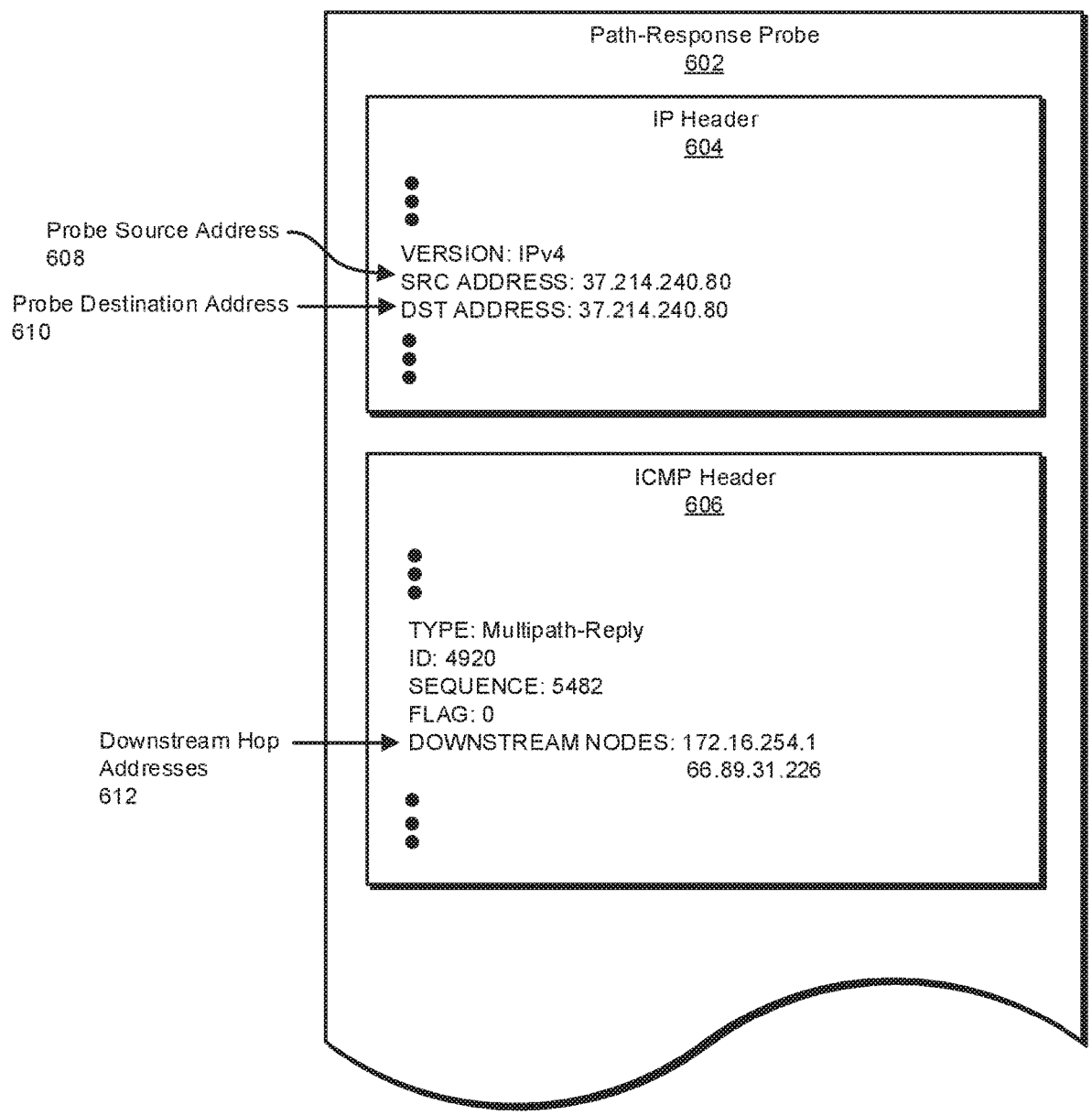
FIG. 6 is an illustration of an additional exemplary packet for discovering network paths.

After source node 202 identifies each suitable and/or appropriate next hop, source node 202 may add the IP addresses of these next hops to a path-response probe. FIG. 6 illustrates an exemplary path-response probe 602 that may be generated by source node 202. Similar to path-request probe 502, path-response probe 602 may contain an IP header 604 and an ICMP header 606. In this example, IP header 604 may include a probe source address 608 and a probe destination address 610. As shown in FIG. 6, both of these IP addresses may correspond to the IP address of source node 202 (shown in FIG. 5).

ICMP header 606 may include one or more data fields that indicate and/or describe each next hop discovered by source node 202. In some examples, at least one of these data fields may be encoded via a TLV encoding scheme.

In one example, a data field within ICMP header 606 may indicate that path-response probe 602 is a "multipath-reply" packet. This indication may inform discovery module 106 that path-response probe 602 contains the IP addresses of one or more recently discovered next hops. ICMP header 606 may also include downstream hop addresses 612 that list the IP addresses of each next hop discovered by source node 202. In one embodiment, downstream hops addresses 612 may correspond to node 402 of network path 410 and node 404 of network path 412 illustrated in FIG. 4.

In some embodiments, discovery module 106 may receive path-response probe 602 at source node 202 after source node 202 forwards path-response probe 602 to its own network stack. In response to receiving path-response probe 602, discovery module 106 may identify downstream hop addresses 612 within ICMP header 606. Discovery module 106 may then record and/or store these addresses. For example, discovery module 106 may add downstream hop addresses 612 to a map, tree, table, and/or other data structure that indicates the nodes within each discovered network path. In some embodiments, discovery module 106 may continue to update this data structure as new hops are discovered.

In some examples, discovery module 106 may identify a particular network path in which a next hop resides based on information included within the path-response probe that identified the next hop. For example, as shown in FIG. 6, ICMP header 606 may include an identification number and/or a sequence number. These numbers may enable discovery module 106 to determine that path-response probe 602 was sent in response to path-request probe 502. Specifically, discovery module 106 may compare the identification number and/or sequence number of path-response probe 602 with an identification number and/or sequence number of path-request probe 502. In response to determining that these numbers match and/or correspond, discovery module 106 may determine that the next hops listed in path-response probe 602 are next hops in network paths that begin at source node 202.

Returning to FIG. 3, at step 320(B) discovery module 106 may send, from source node 202 to each next hop, a path-request probe that prompts the next hop to (1) determine each next-closest hop that resides between the next hop and the destination node and (2) return, to the source node, a path-response probe that identifies the next-closest hops as residing between the next hop and the destination node. The systems described herein may perform step 320(B) in a variety of different ways and/or contexts. In some examples, discovery module 106 may send a path-request probe to each next hop that was identified during step 320(A). Continuing the example of FIGS. 4-6, discovery module 106 may send a path-request probe to each of downstream hop addresses 612. Such path-request probes may be generally similar to path-request probe 502.

Figure 7:
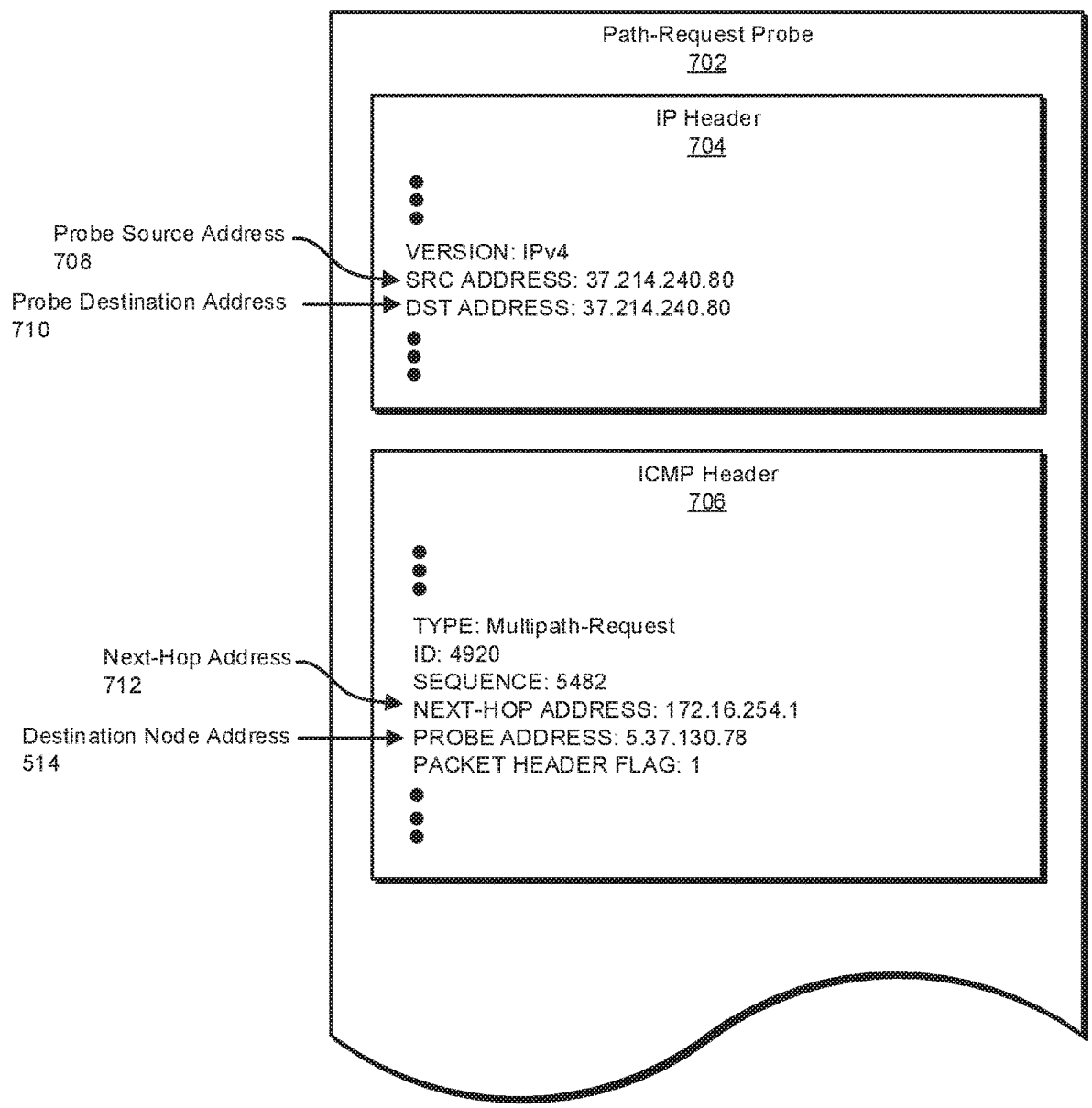
FIG. 7 is an illustration of an additional exemplary packet for discovering network paths.

FIG. 7 illustrates an exemplary path-request probe 702 that discovery module 106 may send to one of downstream hop addresses 612. As shown in FIG. 7, an IP header 704 of path-request probe 702 may include a probe source address 708 that identifies the IP address of source node 202. IP header 704 may also include a probe destination address 710 that identifies an IP address of a node to which path-request probe 702 is at least intermediately destined. In the example of FIG. 7, an ICMP header 706 of path-request probe 702 may also include a next-hop address 712 that identifies the IP address of the final destination of path-response probe 602. In addition, ICMP header 706 may include destination node address 514 (i.e., the IP address of destination node 206). Path-request probe 702 may contain any additional information (such as an identification number, a sequence number, and/or a packet header flag) that facilitates discovering subsequent hops within one or more network paths.

In some examples, probe destination address 710 may correspond to a node that resides immediately upstream from the final destination of path-request probe 702. For example, probe destination address 710 may correspond to the IP address of the node that discovered next-hop address 712. Accordingly, as shown in FIG. 7, probe destination address 710 may correspond to the IP address of source node 202. In this example, discovery module 106 may forward path-request probe 702 to next-hop address 712 by way of source node 202. For example, discovery module 106 may forward path-request probe 702 to the network stack of source node 202. The network stack of source node 202 may then identify next-hop address 712 within ICMP header 706 and determine whether source node 202 is capable of forwarding path-request probe 702 to next-hop address 712. For example, source node 202 may determine whether next-hop address 712 is currently available to and/or reachable from source node 202. In the event that source node 202 is capable of forwarding path-request probe 702 to next-hop address 712, source node 202 may replace, within IP header 704, probe destination address 710 with next-hop address 712. Source node 202 may then forward path-request probe 702 to next-hop address 712. Source node 202 may perform a variety of alternative actions in the event that source node 202 is not capable of forwarding path-request probe 702 to next-hop address 712, such as dropping path-request probe 702 and/or returning an error message to discovery module 106.

In one embodiment, discovery module 106 may send a similar path-request probe to the other IP address within downstream hop addresses 612. In this embodiment, discovery module 106 may include, within this path-request probe, a new identification number and/or sequence number (e.g., compared to the numbers within path-request probe 702). In this way, discovery module 106 may establish and/or indicate that the node at this IP address resides within a different network path than the node at probe destination address 710.

In some examples, next-hop address 712 may correspond to node 402 within network path 410. In these examples, the other IP address within downstream hop addresses 612 may correspond to node 404 within network path 412. In response to receiving a path-request probe from source node 202, nodes 402 and 404 may both identify each next-closest hop between themselves and destination node 206. For example, nodes 402 and 404 may search their routing tables for IP addresses of each next-closest downstream hop. Nodes 402 and 404 may then each list these IP addresses within a path-response probe and forward the path-response probes to source node 202.

Returning to FIG. 3, at step 320(C) discovery module 106 may receive, at the source node, the path-response probes from the next hops. The systems described herein may perform step 320(C) in a variety of different ways and/or contexts. In some examples, discovery module 106 may determine that source node 202 receives a path-response probe in response to each path-request probe that was sent in step 320(B). Continuing with the example of FIGS. 4-7, discovery module 106 may receive a path-response probe from node 402 in response to path-request probe 702. Discovery module 106 may also receive a path-response probe from node 404 in response to the path-request probe sent to node 404.

Figure 8:
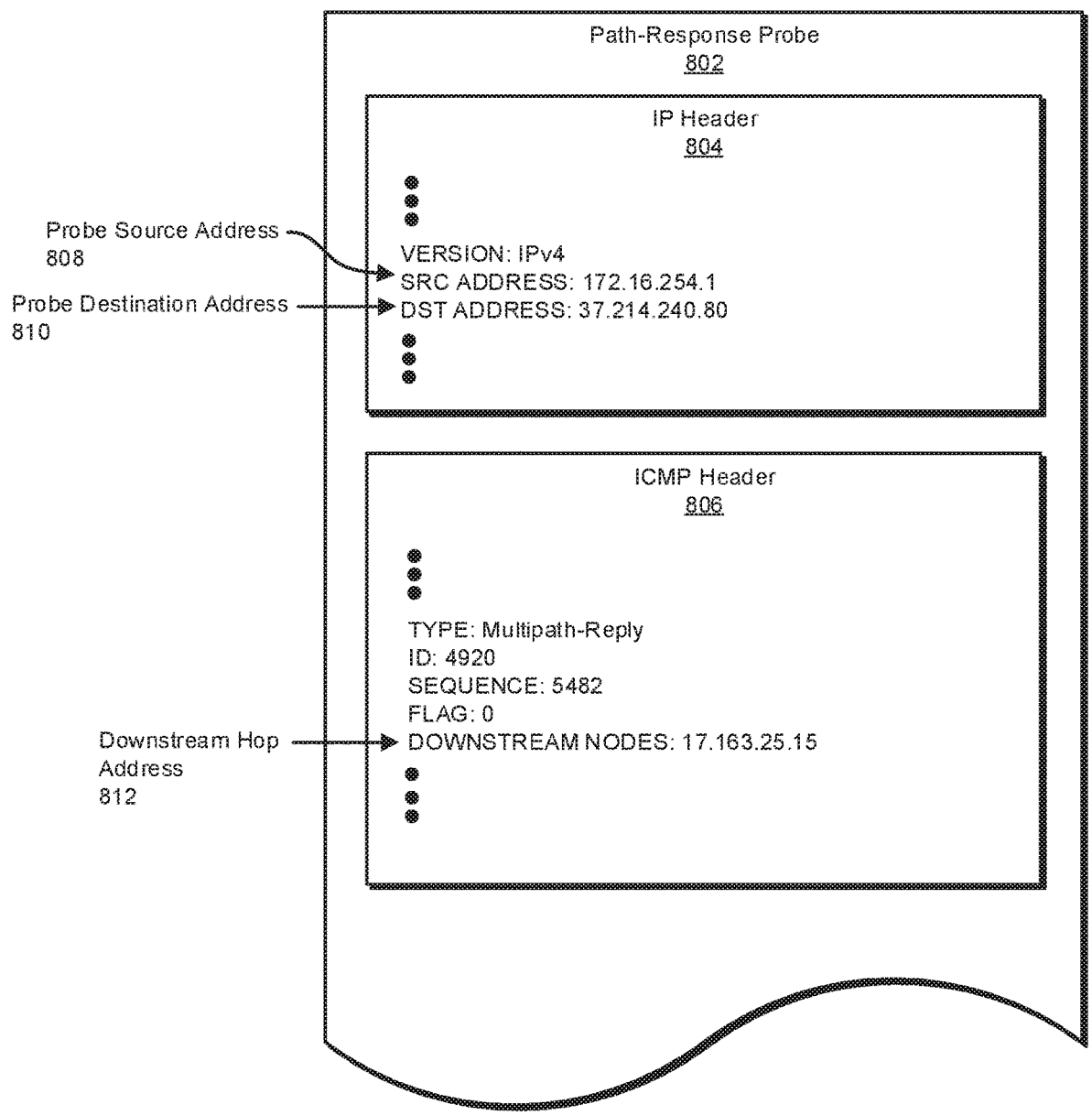
FIG. 8 is an illustration of an additional exemplary packet for discovering network paths.

FIG. 8 illustrates an exemplary path-response probe 802 that discovery module 106 may receive from node 402. As shown in FIG. 8, an IP header 804 of path-response probe 802 may include a probe source address 808 that identifies the IP address of node 402. IP header 804 may also include a probe destination address 810 that identifies the IP address of source node 202. In addition, path-response probe 802 may include an ICMP header 806 that identifies a downstream hop address 812. In one embodiment, downstream hop address 812 may correspond to the IP address of node 406 in FIG. 4. As shown in FIG. 4, node 406 may reside within both network path 410 and network path 412. Accordingly, discovery module 106 may receive, from node 404, a path-response probe that also identifies node 406 as a next-closest hop. Although FIG. 4 illustrates a single next-closest hop for both node 402 and node 404, in some examples node 402 and/or 404 may discover one or more additional next-closest hops (and then list the IP addresses of these next-closest hops within the path-response probes sent to source node 202).

Returning to FIG. 3, at step 320(D) discovery module 106 may determine, at the source node based at least in part on the path-response probes, that one or more of the plurality of network paths include (1) the next hops that reside between the source node and the destination node and (2) the next-closest hops that reside between the next hops and the destination node. The systems described herein may perform step 320(D) in a variety of different ways and/or contexts. In some examples, discovery module 106 may determine, for each next hop listed within a path-response probe received at source node 202, all of the network paths that include the next hop. As described above in connection with step 320(A), discovery module 106 may determine a specific network path in which a next hop resides based at least in part on identification numbers and/or sequence numbers included within the path-response probe that identified the next hop.

Continuing with the example of FIGS. 4-8, discovery module 106 may determine that nodes 402 and 404 reside within network path 410 based on the identification numbers and/or sequence numbers of path-request probe 502, path-response probe 602, path-request probe 702, and path-response probe 802. Similarly, discovery module 106 may determine that node 404 and node 406 reside within network path 412 based on the identification numbers and/or sequence numbers of path-request probe 502, path-response probe 602, the path-request probe sent to node 404, and the path-response probe received from node 404.

Returning to FIG. 3, at step 320(E) discovery module 106 may iteratively discover any subsequent hops that reside between the next-closest hops and the destination node by sending a subsequent path-request probe to each next-closest hop. The systems described herein may perform step 320(E) in a variety of different ways and/or contexts. In some examples, discovery module 106 may send a path-request probe to each next-closest hop identified in step 320(C). Continuing with the example of FIGS. 4-8, discovery module 106 may send a path-request probe to node 406 in response to path-response probe 802. In some examples, discovery module 106 may send an additional path-request probe to node 406 in response to the path-response probe received from node 404.

In one example, discovery module 106 may forward a path-request probe from source node 202 to node 406 via node 402. Specifically, discovery module 106 may send, to node 402, a path-request probe that contains the IP address of node 406. In this example, node 402 may receive the path-request probe and then determine whether the IP address of node 406 is currently available to and/or reachable from node 402. In the event that node 402 determines that node 402 is available and/or reachable, node 402 may forward the path-request probe to node 406. In other examples, discovery module 106 may send a path-request probe directly to node 406.

In response to receiving a path-request probe, node 406 may repeat the process of returning a path-response probe to source node 202. This path-response node may identify node 408 (and any additional node not illustrated in FIG. 4) as a subsequent hop between node 406 and destination node 206.

In some examples, discovery module 106 may facilitate the cycle of sending path-request probes and receiving path-response nodes until every hop within each possible (e.g., requested) network path between source node 202 and destination node 206 has been discovered. This iterative process may involve any number of cycles, path-request probes, and/or path-response probes. For example, whenever a network path branches (e.g., whenever a hop has multiple next-closest hops), an additional so-called chain of path-request and path-response probes may be generated for each new branch. Discovery module 106 may continue to discover subsequent hops within each branch until determining that the branch reaches and/or converges at destination node 206.

In some examples, discovery module 106 may determine that a network path branch has reached destination node 206 in response to discovery module 106 receiving a path-response probe from destination node 206. Such a path-response probe may indicate that each hop within one or more particular network paths has been discovered. In some embodiments, discovery module 106 may conclude that each network path between source node 202 and destination node 206 has been discovered in response to determining that each chain of path-request and path-response probes includes a path-response probe from destination node 206.

Figure 9:
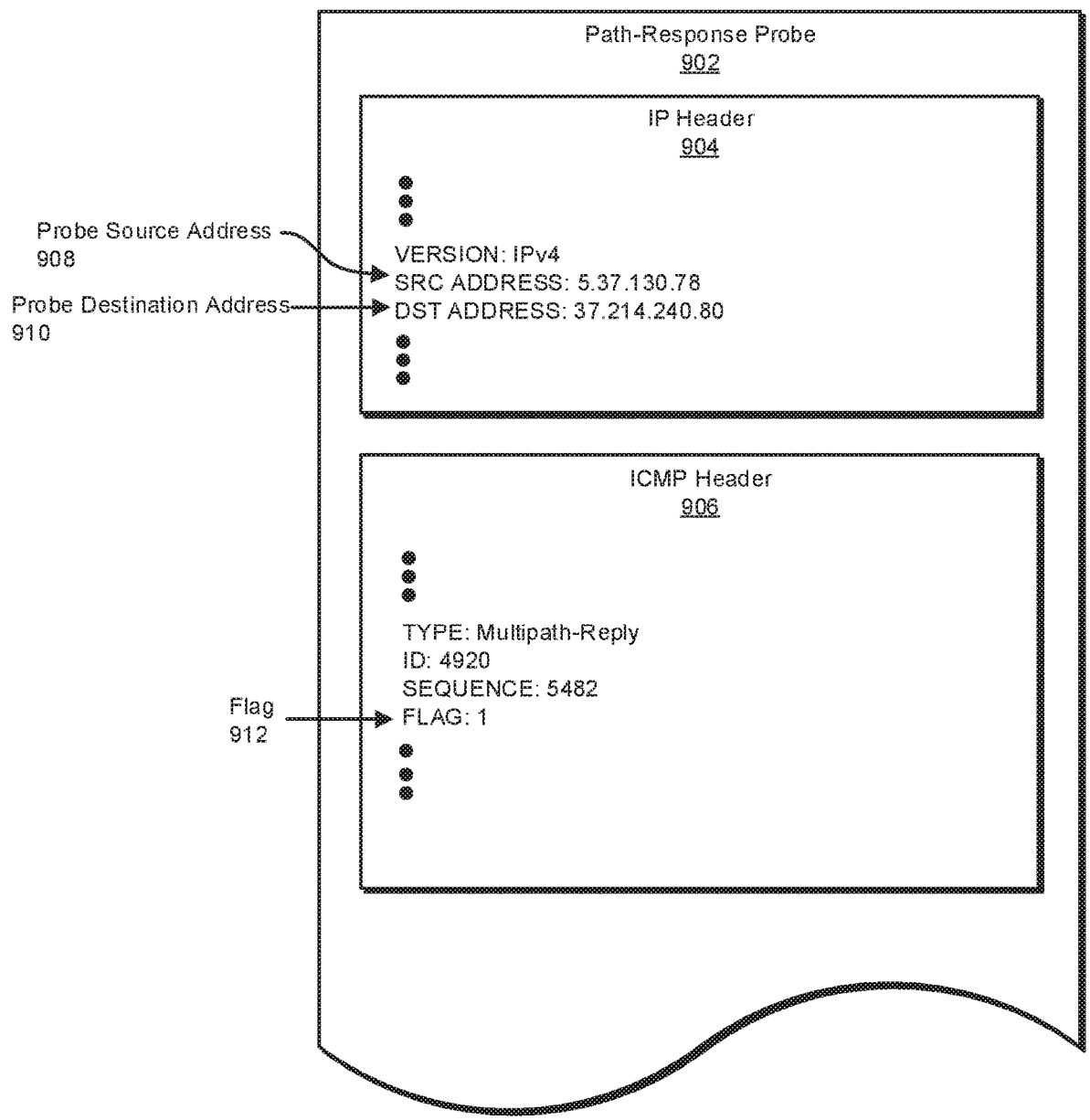
FIG. 9 is an illustration of an additional exemplary packet for discovering network paths.

FIG. 9 illustrates an exemplary path-response probe 902 that may be generated by destination node 206. In this example, an IP header 904 of path-response probe 902 may include a probe source address 908 that identifies the IP address of destination node 206. IP header 904 may also include a probe destination address 910 that identifies the IP address of source node 202. In addition, path-response probe 902 may include an ICMP header 906 that contains a flag 912. In the event that this flag is set (as illustrated in FIG. 9), discovery module 106 may determine that path-response probe 902 originated from destination node 206. Accordingly, discovery module 106 may not send any path-request probes in response to path-response probe 902.

The systems described herein may perform a variety of actions after discovering one or more network paths that lead between source node 202 and destination node 206. In some examples, request module 104 may provide each discovered network path to an application, user, administrator, device, and/or other entity that initiated the request to discover the network paths. For example, request module 104 may provide the entity that initiated the request a network path map that lists each discovered hop.

Such a network path map may be used in a variety of ways to improve the performance, security, and/or functionality of one or more network devices and/or network paths. In one embodiment, a network-troubleshooting application may utilize a network path map to detect and then fix a failure or malfunction within a particular node. For example, in response to detecting a potential error within one or more network paths (e.g., determining that at least a portion of the packets addressed to a destination node do not reach the destination node), the application may request the disclosed systems to provide a network path map that identifies network paths that lead to the destination node. The application may then assess the functionality of each node listed within the map to identify a particular node that is malfunctioning. In another embodiment, a network-mapping application may utilize a network path map to track and/or record the topology of a network. This action may enable network devices to more efficiently route and/or forward packets within a network.

Figure 10:
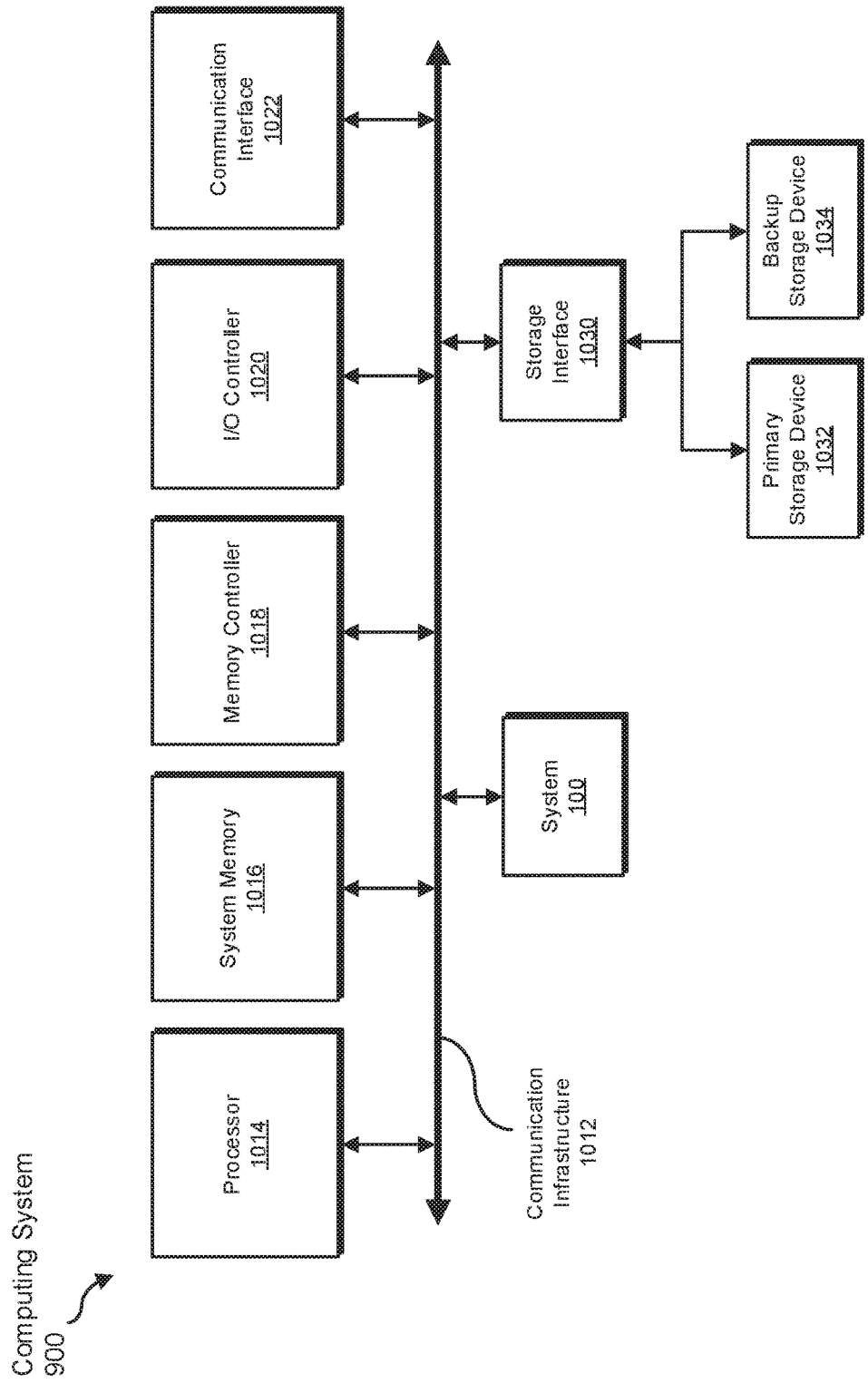
FIG. 10 is a block diagram of an exemplary computing system capable of implementing and/or being used in connection with one or more of the embodiments described and/or illustrated herein.

FIG. 10 is a block diagram of an exemplary computing system 1000 capable of implementing and/or being used in connection with one or more of the embodiments described and/or illustrated herein. In some embodiments, all or a portion of computing system 1000 may perform and/or be a means for performing, either alone or in combination with other elements, one or more of the steps described in connection with FIG. 3. All or a portion of computing system 1000 may also perform and/or be a means for performing and/or implementing any other steps, methods, or processes described and/or illustrated herein. In one example, computing system 1000 may include and/or store all or a portion of modules 102 from FIG. 1.

Computing system 1000 broadly represents any type or form of electrical load, including a single or multi-processor computing device or system capable of executing computer-readable instructions. Examples of computing system 1000 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1000 may be programmed, configured, and/or otherwise designed to comply with one or more networking protocols. According to certain embodiments, computing system 1000 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1000 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1000 may include various network and/or computing components. For example, computing system 1000 may include at least one processor 1014 and a system memory 1016. Processor 1014 generally represents any type or form of processing unit capable of processing data or interpreting and executing instructions. For example, processor 1014 may represent an application-specific integrated circuit (ASIC), a system on a chip (e.g., a network processor), a hardware accelerator, a general purpose processor, and/or any other suitable processing element.

Processor 1014 may process data according to one or more of the networking protocols discussed above. For example, processor 1014 may execute or implement a portion of a protocol stack, may process packets, may perform memory operations (e.g., queuing packets for later processing), may execute end-user applications, and/or may perform any other processing tasks.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1000 may include both a volatile memory unit (such as, for example, system memory 1016) and a non-volatile storage device (such as, for example, primary storage device 1032, as described in detail below). System memory 1016 may be implemented as shared memory and/or distributed memory in a network device. Furthermore, system memory 1016 may store packets and/or other information used in networking operations.

In certain embodiments, exemplary computing system 1000 may also include one or more components or elements in addition to processor 1014 and system memory 1016. For example, as illustrated in FIG. 10, computing system 1000 may include a memory controller 1018, an Input/Output (I/O) controller 1020, and a communication interface 1022, each of which may be interconnected via communication infrastructure 1012. Communication infrastructure 1012 generally represents any type or form of infrastructure capable of facilitating communication between one or more components of a computing device. Examples of communication infrastructure 1012 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1018 generally represents any type or form of device capable of handling memory or data or controlling communication between one or more components of computing system 1000. For example, in certain embodiments memory controller 1018 may control communication between processor 1014, system memory 1016, and I/O controller 1020 via communication infrastructure 1012. In some embodiments, memory controller 1018 may include a Direct Memory Access (DMA) unit that may transfer data (e.g., packets) to or from a link adapter.

I/O controller 1020 generally represents any type or form of device or module capable of coordinating and/or controlling the input and output functions of a computing device. For example, in certain embodiments I/O controller 1020 may control or facilitate transfer of data between one or more elements of computing system 1000, such as processor 1014, system memory 1016, communication interface 1022, and storage interface 1030.

Communication interface 1022 broadly represents any type or form of communication device or adapter capable of facilitating communication between exemplary computing system 1000 and one or more additional devices. For example, in certain embodiments communication interface 1022 may facilitate communication between computing system 1000 and a private or public network including additional computing systems. Examples of communication interface 1022 include, without limitation, a link adapter, a wired network interface (such as a network interface card), a wireless network interface (such as a wireless network interface card), and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1022 may also represent a host adapter configured to facilitate communication between computing system 1000 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also enable computing system 1000 to engage in distributed or remote computing. For example, communication interface 1022 may receive instructions from a remote device or send instructions to a remote device for execution.

As illustrated in FIG. 10, exemplary computing system 1000 may also include a primary storage device 1032 and/or a backup storage device 1034 coupled to communication infrastructure 1012 via a storage interface 1030. Storage devices 1032 and 1034 generally represent any type or form of storage device or medium capable of storing data and/or other computer-readable instructions. For example, storage devices 1032 and 1034 may represent a magnetic disk drive (e.g., a so-called hard drive), a solid state drive, a floppy disk drive, a magnetic tape drive, an optical disk drive, a flash drive, or the like. Storage interface 1030 generally represents any type or form of interface or device for transferring data between storage devices 1032 and 1034 and other components of computing system 1000.

In certain embodiments, storage devices 1032 and 1034 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1034 may also include other similar structures or devices for allowing computer software, data, or other computer-readable instructions to be loaded into computing system 1000. For example, storage devices 1032 and 1034 may be configured to read and write software, data, or other computer-readable information. Storage devices 1032 and 1034 may be a part of computing system 1000 or may be separate devices accessed through other interface systems.

Many other devices or subsystems may be connected to computing system 1000. Conversely, all of the components and devices illustrated in FIG. 10 need not be present to practice the embodiments described and/or illustrated herein. The devices and subsystems referenced above may also be interconnected in different ways from those shown in FIG. 10. Computing system 1000 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    receiving, at a source node, a request to discover a plurality of network paths that each lead from the source node to a destination node; and
    simultaneously discovering the plurality of network paths that lead from the source node to the destination node by:
        identifying each next hop that resides between the source node and the destination node;
        sending, from the source node to each next hop, a path-request probe that prompts the next hop to:
            determine each next-closest hop that resides between the next hop and the destination node by directing the next hop to identify, within a routing table of the next hop, an Internet protocol address of each next-closest hop based at least in part on an Internet protocol address of the destination node; and
            return, to the source node, a path-response probe that identifies the next-closest hops as residing between the next hop and the destination node by directing the next hop to list the Internet protocol address of each next-closest hop within a type-length-value field of the path-response probe;
        receiving, at the source node, the path-response probes from the next hops;
        determining, at the source node based at least in part on the path-response probes, that one or more of the plurality of network paths include:
            the next hops that reside between the source node and the destination node; and
            the next-closest hops that reside between the next hops and the destination node; and
        iteratively discovering any subsequent hops that reside between the next-closest hops and the destination node by sending a subsequent path-request probe to each next-closest hop.

2. The method of claim 1, wherein receiving the request to discover the plurality of network paths comprises receiving a request to discover each equal-cost network path between the source node and the destination node.

3. The method of claim 1, wherein receiving the request to discover the plurality of network paths comprises receiving a request to discover each network path between the source node and the destination node for a packet with at least one particular characteristic.

4. The method of claim 1, wherein receiving the request to discover the plurality of network paths comprises receiving the request from a traceroute application running within the source node.

5. The method of claim 4, wherein identifying each next hop that resides between the source node and the destination node comprises sending an initial path-request probe from the traceroute application to a network stack maintained by the source node.

6. The method of claim 1, wherein sending the subsequent path-request probe to the next-closest hop comprises:
    including, within the subsequent path-request probe, a network address of the next-closest hop;
    sending the path-request probe to a next hop that resides between the source node and the next-closest hop;
    determining, by the next hop, that the next hop is capable of forwarding the subsequent path-request probe to the network address of the next-closest hop; and forwarding, by the next hop, the subsequent path-request probe to the network address of the next-closest hop.

7. The method of claim 1, wherein iteratively discovering the subsequent hops that reside between the next-closest hops and the destination node comprises sending subsequent path-request probes in response to one or more subsequent path-response probes received at the source node until receiving at least one final path-response probe from the destination node.

8. The method of claim 1, further comprising enabling an application that initiated the request to discover the plurality of network paths to detect a malfunction within at least one node within the plurality of network paths by providing, to the application, a network path map that identifies nodes within each of the plurality of network paths.

9. A system comprising:
a request module, stored in memory, that receives, at a source node, a request to discover a plurality of network paths that each lead from the source node to a destination node;
a discovery module, stored in memory, that simultaneously discovers the plurality of network paths that lead from the source node to the destination node by:
identifying each next hop that resides between the source node and the destination node;
sending, from the source node to each next hop, a path-request probe that prompts the next hop to:
determine each next-closest hop that resides between the next hop and the destination node by directing the next hop to identify, within a routing table of the next hop, an Internet protocol address of each next-closest hop based at least in part on an Internet protocol address of the destination node; and
return, to the source node, a path-response probe that identifies the next-closest hops as residing between the next hop and the destination node by directing the next hop to list the Internet protocol address of each next-closest hop within a type-length-value field of the path-response probe;
receiving, at the source node, the path-response probes from the next hops;
determining, at the source node based at least in part on the path-response probes, that one or more of the plurality of network paths include:
the next hops that reside between the source node and the destination node; and
the next-closest hops that reside between the next hops and the destination node; and
iteratively discovering any subsequent hops that reside between the next-closest hops and the destination node by sending a subsequent path-request probe to each next-closest hop; and
at least one hardware processor configured to execute the request module and the discovery module.

10. The system of claim 9, wherein the request module receives a request to discover each equal-cost network path between the source node and the destination node.

11. The system of claim 9, wherein the request module receives a request to discover each network path between the source node and the destination node for a packet with at least one particular characteristic.

12. The system of claim 9, wherein the request module receives the request from a traceroute application running within the source node.

13. The system of claim 12, wherein the discovery module identifies each next hop that resides between the source node and the destination node by sending an initial path-request probe from the traceroute application to a network stack maintained by the source node.

14. The system of claim 9, wherein the discovery module sends the subsequent path-request probe to the next-closest hop by:
including, within the subsequent path-request probe, a network address of the next-closest hop; and
sending the path-request probe to a next hop that resides between the source node and the next-closest hop, wherein the next hop:
determines that the next hop is capable of forwarding the subsequent path-request probe to the network address of the next-closest hop; and
forwards the subsequent path-request probe to the network address of the next-closest hop.

15. The system of claim 9, wherein the discovery module iteratively discovers the subsequent hops that reside between the next-closest hops and the destination node by sending subsequent path-request probes in response to one or more subsequent path-response probes received at the source node until receiving at least one final path-response probe from the destination node.

16. An apparatus comprising:
at least one storage device that stores information that identifies next hops of a source node within a network; and
at least one physical processing device communicatively coupled to the storage device at the source node, wherein the physical processing device:
receives, at the source node, a request to discover a plurality of network paths that each lead from the source node to a destination node; and
simultaneously discovers the plurality of network paths that lead from the source node to the destination node by:
identifying, based at least in part on the information stored in the storage device, each next hop that resides between the source node and the destination node;
sending, from the source node to each next hop, a path-request probe that prompts the next hop to:
determine each next-closest hop that resides between the next hop and the destination node by directing the next hop to identify, within a routing table of the next hop, an Internet protocol address of each next-closest hop based at least in part on an Internet protocol address of the destination node; and
return, to the source node, a path-response probe that identifies the next-closest hops as residing between the next hop and the destination node by directing the next hop to list the Internet protocol address of each next-closest hop within a type-length-value field of the path-response probe;
receives, at the source node, the path-response probes from the next hops;
determines, at the source node based at least in part on the path-response probes, that one or more of the plurality of network paths include:
the next hops that reside between the source node and the destination node; and
the next-closest hops that reside between the next hops and the destination node; and
iteratively discovers any subsequent hops that reside between the next-closest hops and the destination node by sending a subsequent path-request probe to each next-closest hop.

* * * * *